United States Patent Office 3,843,399

Patented Oct. 22, 1974

3,843,399

METALLIZED VIDEO DISC HAVING AN INSULATING LAYER THEREON

Michael Kaplan and Dennis Lee Matthies, Princeton, N.J., assignors to RCA Corporation No Drawing. Filed Apr. 19, 1972, Ser. No. 245,664
Int. Cl. G11b 5/00
U.S. Cl. 117—217 3 Claims

ABSTRACT OF THE DISCLOSURE

A polymeric dielectric coating is applied to video discs by glow discharge techniques.

This invention relates to the manufacture of video discs. More particularly, this invention relates to improved video discs having a thin dielectric coating thereon capable of excellent playback which have long life.

BACKGROUND OF THE INVENTION

A novel video recording and playback system has been described by Clemens in copending application Ser. No. 126,772 filed Mar. 22, 1971. According to this method, disc replicas can be prepared having geometric variations in the bottom of a spiral groove in the disc surface which correspond to capacitance variations representative of video signals. The conductive discs are coated with a thin dielectric coating. A metal stylus completes the capacitor and, during playback, rides upon the dielectric coating and detects dimensional variations in the groove bottom. These variations are reconstituted in electrical signal form and converted back to video information suitable for display by a television monitor.

In this system then, the metal stylus is separated from the conductive disc surface only by the thin dielectric layer. In order to be able to produce good quality recordings, this dielectric layer must be uniform in depth and composition, thin enough so that the minute dimensional variations in the groove can be detected in an exact manner and yet without faults or piholes which would cause shorts due to metal-metal contact during playback. In addition, the coating must be strong enough to withstand repeated passes of the stylus without damage to the coating or to the signal elements on the disc surface. Thus the coating must have lubricant properties as well as high strength. Still further, this dielectric layer must be able to be applied in a rapid and simple manner, suitable for mass production techniques.

SUMMARY OF THE INVENTION

It is an object of the present invention to provide conductive video discs having a thin uniform coating of a dielectric thereon.

It is a further object to provide video discs having a thin uniform coating of a dielectric thereon, which coating has a good appearance, is strong and has lubricating and insulating properties.

It is another object to provide a process for applying a thin uniform coating of a dielectric on a spiral grooved video disc having minute geometric variations in the bottom of the groove.

Further objects will become apparent from the following detailed description thereof.

It has been discovered that thin, uniform, strong coatings of certain polymeric films can be applied readily and rapidly to conductive video discs by glow discharge techniques.

DETAILED DESCRIPTION OF THE INVENTION

Glow discharge techniques can be employed to coat a conductive video disc having video information recorded in the form of geometric variations in the bottom of a spiral groove with certain polymeric films. The resultant films are uniform, tough dielectric coatings which can be repeatedly contacted with a metal tipped stylus without damage. This method provides discs suitable for low noise, high quality playback of video information recorded in the form of the geometric patterns in the grooves through numerous playbacks.

Monomers suitable for use in forming thin coatings on video discs according to the present invention include styrene, substituted styrenes such as p-methylstyrene and tran-$\beta$-methylstyrene and the like; alkyl-substituted silanes such as triethylsilane, trimethylsilane, tetraethylsilane, vinyltrimethylsilane and the like; alkenes and cycloalkenes such as 1,3-butadiene, trans-2-heptene, cyclohexene and the like; alkene-substituted benzenes such as divinylbenzene and the like; halogenated compounds such as tetrafluoroethylene, methylene chloride and the like; and polysiloxanes such as dimethylpolysiloxane and the like. Mixtures of the above, such as mixtures of styrene with trimethylsilane, triethylsilane, tetraethylsilane and the like can also be employed. Styrene is readily available and forms highly crosslinked, tough, adherent films and is therefore preferred.

The thickness of the polymeric film applied to the metallized disc can vary from about 200 to 3000 A., and preferably is from about 200 to 1000 A. in thickness.

According to the process of the invention, the conductive video disc is mounted in a vacuum chamber, parallel to but separate from a second conductive disc. The discs act as electrodes during deposition of the film coating. Electrical connections are contacted with the discs and connected to a source of current. The chamber is then evacuated, preferably to a pressure below about $10^{-3}$ torr, and sufficient monomer is then charged to the chamber so as to deposit the desired amount of polymeric film on the cathode disc. The monomer pressure can vary from about 10 to 2000, preferably 50 to 300 microns. Alternatively, a continuous flow of monomer can be added to the vacuum chamber until the desired film thickness is obtained on the cathode disc.

A potential is applied to the discs, causing a glow inside the chamber between the discs. The monomer polymerizes on the surface of the discs. The current must be of sufficient duration to allow deposition of the desired film thickness. The current can be direct current or alternating current. Preferably, 60 cycle alternating current is employed due to its low cost and ready availability. The amount of monomer and current can be varied depending on the thickness of polymeric film desired and the geometry of the deposition system, and can be readily determined by a series of test runs by one skilled in the art.

In addition to the desired monomer or mixture of monomers, a carrier gas can also be present during glow discharge. The presence of a carrier gas increases the total pressure of the system and enables one to choose a convenient pressure region in which a glow discharge will form. The carrier gas can be introduced at a pressure from about 100 to about 5000 microns. Suitable inert carrier gases include the noble gases, such as neon, argon, krypton, helium and the like, and nitrogen.

When the polymer film of desired thickness has been applied to the conductive video disc, the vacuum is broken and the disc removed from the chamber, ready for playback.

The invention can be further illustrated by the following example, but it is to be understood that the invention is not meant to be limited to the details described therein.

EXAMPLE

A vinyl disc about 12 inches in diameter containing a spiral groove on the surface with a pitch of about 4000 grooves per inch and coated with a film of aluminum about 500 A. in thickness, was mounted in a vacuum chamber fitted with another 12 inch diameter aluminum disc such that the two discs were parallel and spaced about 2–3 centimeters apart. One electrical lead from each disc was connected to a source of 60 Hz current such that the applied potential during glow discharge was 0.8 kv. The chamber was evacuated to a pressure below $10^{-3}$ torr and styrene injected into the chamber to a partial pressure of 200 microns. Argon was also admitted to the chamber to a partial pressure of 300 microns.

The current was turned on for 40 seconds. After releasing the vacuum, the disc, containing a polystyrene coating, was removed from the chamber.

A uniform tough, adherent film of polystyrene about 500 A. in thickness was deposited on the disc.

We claim:

1. An information record adapted for use with a playback stylus to effect recovery of signals occupying a bandwidth of at least several megahertz when relative motion at a desired rate is established between said record and said stylus, said record comprising:

(a) a disc having a spiral groove in a surface thereof, said groove being dimensioned for reception therein of said stylus and containing an information track constituted by geometric variations in the bottom of said groove, (b) a continuous conductive metal layer on said surface, said layer being of substantially uniform thickness, and (c) a thin dielectric coating of uniform thickness overlying said metal layer, said dielectric coating being a polystyrene applied in a glow discharge, and the combined thickness of said conductive layer and said dielectric coating do not fill said groove, allowing for reception of said stylus within said groove during playback.

2. An ifnormation record according to claim 1 wherein said dielectric coating from 200 to 3000 Angstroms in thickness.

3. An information record according to claim 1 wherein said dielectric coating is from 200 to 1000 Angstroms in thickness.

References Cited

UNITED STATES PATENTS

| | | | |
|---|---|---|---|
| 3,072,543 | 1/1963 | Lubow et al. | 252—27 |
| 3,466,156 | 9/1969 | Peters et al. | 179—100.2 A |
| 3,109,749 | 11/1963 | Ricco | 179—100.2 A |

FOREIGN PATENTS

| | | |
|---|---|---|
| 153,300 | 2/1922 | Great Britain. |

OTHER REFERENCES

Golding—Polymers and Resins—1962, D. Van Nostrand Co. Inc., p. 514.

CHARLES E. VAN HORN, Primary Examiner

F. FRISENDA, Jr., Assistant Examiner

U.S. Cl. X.R.

117—71 R, 72, 93.1 GD, 160 R, 161 UF, 161 UZ, 218; 179—100.2 A